US011155333B2

(12) United States Patent
Gruner et al.

(10) Patent No.: US 11,155,333 B2
(45) Date of Patent: Oct. 26, 2021

(54) FRICTION STIR WELDED AIRCRAFT STRUCTURE AND METHOD

(71) Applicant: The Boeing Company, Chicago, IL (US)

(72) Inventors: Bryan J. Gruner, Bellevue, WA (US); Lisa G. Schleuter, Everett, WA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 16/548,576

(22) Filed: Aug. 22, 2019

(65) Prior Publication Data
US 2021/0053668 A1    Feb. 25, 2021

(51) Int. Cl.
*B64C 9/32*    (2006.01)
*B64F 5/10*    (2017.01)
*B23K 20/12*    (2006.01)

(52) U.S. Cl.
CPC ............ *B64C 9/323* (2013.01); *B23K 20/122* (2013.01); *B64F 5/10* (2017.01); *B41J 2202/11* (2013.01)

(58) Field of Classification Search
CPC ......... B64C 9/323; B64F 5/10; B23K 20/122; B41J 2202/11
See application file for complete search history.

(56) References Cited

U.S. PATENT DOCUMENTS

| 8,939,495 | B2 * | 1/2015 | Kurata | B29C 66/545 |
| | | | | 296/180.1 |
| 2005/0133567 | A1 * | 6/2005 | Runyan | B21D 26/055 |
| | | | | 228/112.1 |
| 2005/0247756 | A1 * | 11/2005 | Frazer | B64C 3/26 |
| | | | | 228/101 |
| 2006/0027630 | A1 * | 2/2006 | Talwar | B23K 20/128 |
| | | | | 228/112.1 |
| 2006/0175468 | A1 | 8/2006 | Huynh et al. | |
| 2009/0050749 | A1 | 2/2009 | Matsuda | |
| 2010/0239813 | A1 | 9/2010 | Fujita et al. | |
| 2016/0176507 | A1 | 6/2016 | Fevergeon et al. | |
| 2017/0259908 | A1 | 9/2017 | Omeara et al. | |
| 2018/0015996 | A1 * | 1/2018 | Shemkunas | B64C 3/18 |
| 2018/0043464 | A1 | 2/2018 | Litwinski | |

FOREIGN PATENT DOCUMENTS

EP    3309059 A1    4/2018
JP    2003266184 A    9/2003

OTHER PUBLICATIONS

Office Action for related European Application No. 2016110888259; report dated Jan. 21, 2021.

* cited by examiner

*Primary Examiner* — Justin M Benedik
(74) *Attorney, Agent, or Firm* — von Briesen & Roper, s.c.

(57) ABSTRACT

An aircraft control structure includes first and second outer surfaced joined to a side wall. Stiffening webs extends between the first and second outer surfaces, each stiffening web at least partially surrounding an associated aperture formed in either the first or second outer surface and defining a stiffening recess. Skin plates are sized to extend over an associated stiffening recess and are shaped to conform to an associated aperture. Each skin plate is joined to an associated stiffening web by a friction stir welded seam.

20 Claims, 10 Drawing Sheets

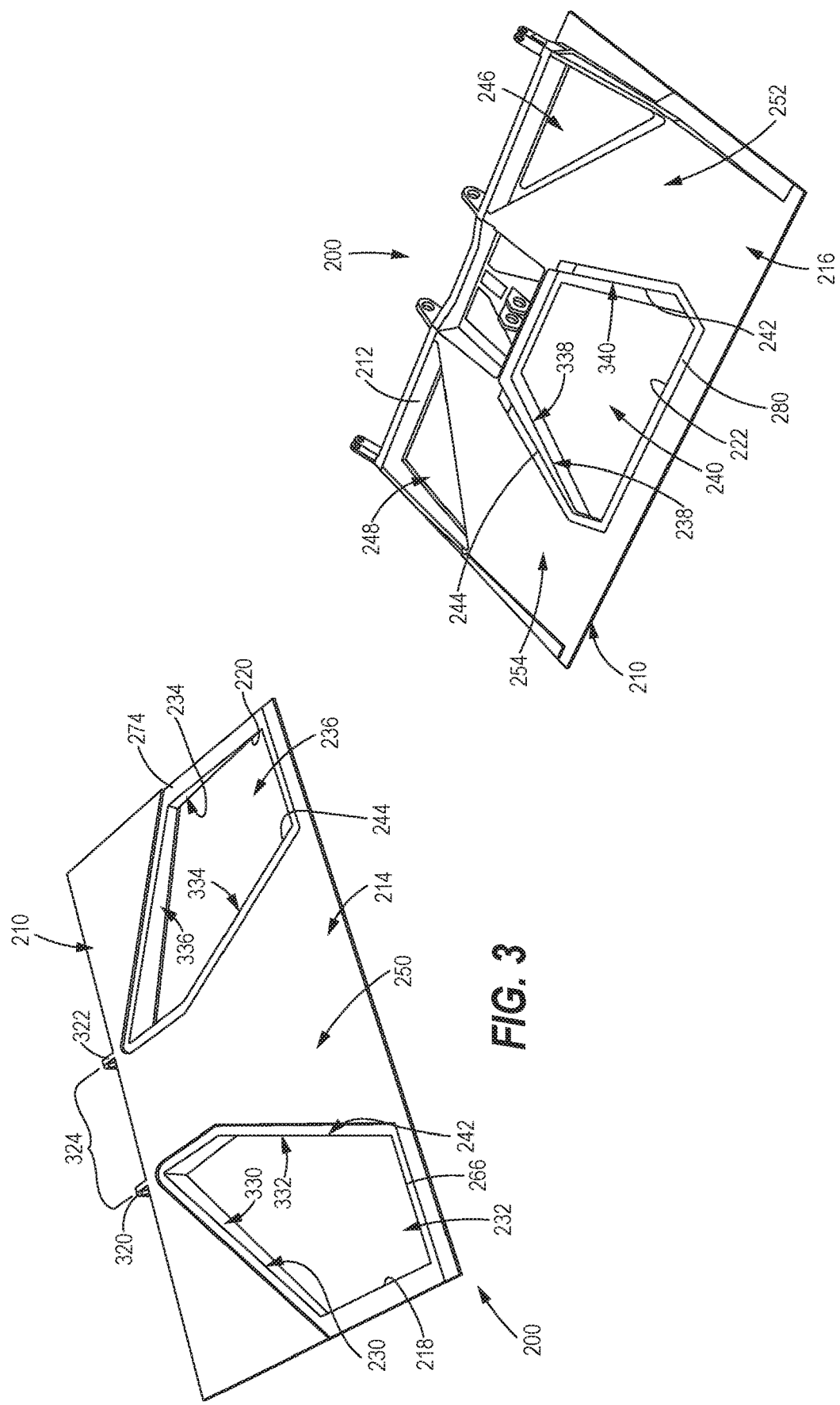

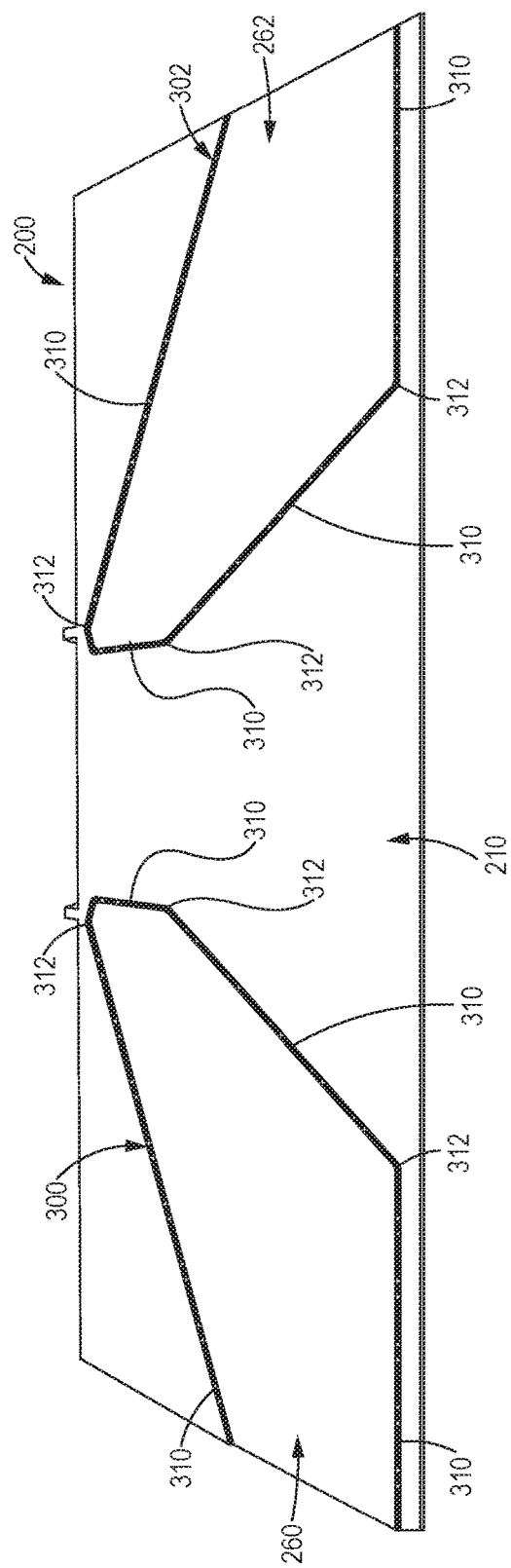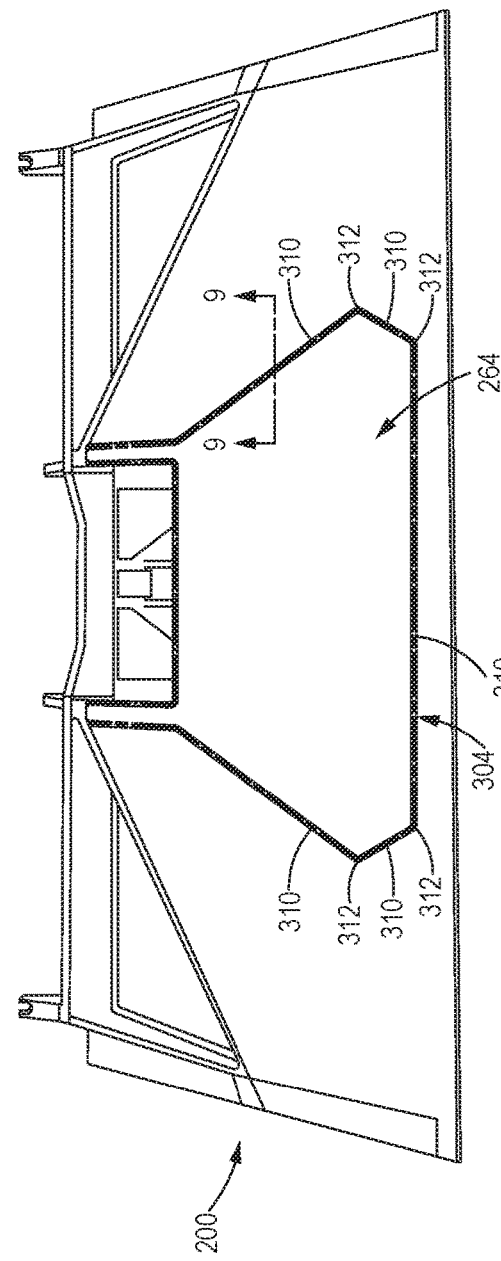

FRICTION STIR WELDED AIRCRAFT STRUCTURE AND METHOD

TECHNICAL FIELD

The present disclosure generally relates to aircraft structures and methods and, more specifically, to friction stir welded aircraft structures having multiple aerodynamic surfaces and methods of forming such structures.

BACKGROUND

Structures used on aircraft may have aerodynamic surfaces (i.e., control surfaces) that are exposed to ambient air during flight. These structures may be formed of two or more components that are joined together. An aircraft spoiler, for example, typically includes multiple components that are fastened or bonded together to form the complete spoiler. One configuration of a spoiler is a monolithic, machined body having a cover attached for aerodynamic purposes. The body has an outer surface facing away from the aircraft wing that is continuously exposed to ambient air during flight. The cover also has an outer surface that typically overlies a flap of the aircraft when in a neutral position, but may move to a deployed position in which the outer surface of the cover is spaced from the flap. Traditional methods of joining such components, such as bolting, require additional labor and expense, add to the weight of the aircraft, and introduce aerodynamic drag.

There is, therefore, a need for improved spoilers and methods of joining spoiler components.

SUMMARY

In accordance with one example, an aircraft control structure includes a side wall, a first outer surface coupled to the side wall, and a second outer surface coupled to the side wall and opposite the first outer surface. A first stiffening web extends between the first outer surface and the second outer surface, the first stiffening web extending at least partially around a first aperture formed in the first outer surface to define a first stiffening recess. A second stiffening web extends between the first outer surface and the second outer surface, the second stiffening web extending at least partially around a second aperture formed in the first outer surface or the second outer surface to define a second stiffening recess. A first skin plate is sized to extend over the first stiffening recess and shaped conformally with the first aperture, wherein the first skin plate is joined to the first stiffening web at a first friction stir welded seam. A second skin plate is sized to extend over the second stiffening recess and shaped conformally with the second aperture, wherein the second skin plate is joined to the second stiffening web at a second friction stir welded seam.

In accordance with another example, an aircraft spoiler includes a side wall, an upper aerodynamic surface coupled to the side wall, and a lower aerodynamic surface coupled to the side wall and opposite the upper aerodynamic surface. A first stiffening web extends between the upper aerodynamic surface and the lower aerodynamic surface, the first stiffening web also extending at least partially around a first aperture formed in the upper aerodynamic surface to define a first stiffening recess, wherein the first stiffening web includes a first mating surface inwardly offset from the upper aerodynamic surface. A second stiffening web extends between the upper aerodynamic surface and the lower aerodynamic surface, the second stiffening web also extending at least partially around a second aperture formed in the upper aerodynamic surface to define a second stiffening recess, wherein the second stiffening web including a second mating surface inwardly offset from the upper aerodynamic surface. A first skin plate is sized to extend over the first stiffening recess and shaped conformally with the first aperture, wherein the first skin plate is joined to the first mating surface of the first stiffening web at a first friction stir welded seam. A second skin plate is sized to extend over the second stiffening recess and shaped conformally with the second aperture, wherein the second skin plate is joined to the second mating surface of the second stiffening web at a second friction stir welded seam.

In accordance with yet another example, a method of forming a monolithic aircraft structure having multiple aerodynamic surfaces includes forming a sub-frame with a side wall, a first outer surface coupled to the side wall, and a second outer surface coupled to the side wall and opposite the first outer surface. The sub-frame is further formed with a first stiffening web extending between the first outer surface and the second outer surface, the first stiffening web extending at least partially around a first aperture formed in the first outer surface to define a first stiffening recess, and a second stiffening web extending between the first outer surface and the second outer surface, the second stiffening web extending at least partially around a second aperture formed in the first outer surface or the second outer surface to define a second stiffening recess. The method includes friction stir welding a first skin plate to the first stiffening web to form a first friction stir welded seam, wherein the first skin plate is sized to extend over the first stiffening recess and shaped conformally with the first aperture. The method further includes friction stir welding a second skin plate to the second stiffening web to form a second friction stir welded seam, wherein the second skin plate is sized to extend over the second stiffening recess and shaped conformally with the second aperture.

In another aspect of the disclosure that may be combined with any of these aspects, the first stiffening web includes a first mating surface inwardly offset from the first outer surface, and in which the first friction stir welded seam joins the first skin plate to the first mating surface of the first stiffening web.

In another aspect of the disclosure that may be combined with any of these aspects, the first skin plate has a first skin plate thickness, and the first mating surface of the first stiffening web is spaced from the first outer surface by an offset distance substantially equal to the first skin plate thickness.

In another aspect of the disclosure that may be combined with any of these aspects, each of the first friction stir welded seam and the second friction stir welded seam comprises a plurality of linear weld line segments.

In another aspect of the disclosure that may be combined with any of these aspects, portions of each of the first friction stir welded seam and the second friction stir welded seam comprise continuously non-linear weld lines.

In another aspect of the disclosure that may be combined with any of these aspects, the continuously non-linear weld lines comprise continuous sinusoidal wave patterns.

In another aspect of the disclosure that may be combined with any of these aspects, first and second lugs are coupled to the side wall to define an intermediate region of the side wall extending between the first and second lugs, and each of the first stiffening web and the second stiffening web includes at least two web segments traversing paths aligned with the intermediate region of the side wall.

In another aspect of the disclosure that may be combined with any of these aspects, the second aperture is formed in the first outer surface and the aircraft control structure further includes a third stiffening web extending between the first outer surface and the second outer surface, wherein the third stiffening web also extends at least partially around a third aperture formed in the second outer surface to define a third stiffening recess, and a third skin plate is sized to extend over the third stiffening recess and shaped conformally with the third aperture, wherein the third skin plate is joined to the third stiffening web at a third friction stir welded seam.

In another aspect of the disclosure that may be combined with any of these aspects, the second aperture is formed in the second outer surface, the first outer surface defines a first raised stiffening section adjacent the first stiffening recess, the second outer surface defines a second raised stiffening section adjacent the second stiffening recess, the first raised stiffening section spans across and defines a portion of the second stiffening recess, and the second raised stiffening section spans across and defines a portion of the first stiffening recess.

In another aspect of the disclosure that may be combined with any of these aspects, the first outer surface comprises an upper aerodynamic surface of a spoiler and the second outer surface comprises a lower aerodynamic surface of the spoiler.

These and other aspects and features will become more readily apparent upon reading the following detailed description when taken in conjunction with the accompanying drawings. In addition, although various features are disclosed in relation to specific examples, it is understood that the various features may be combined with each other, or used alone, with any of the various examples without departing from the scope of the disclosure.

BRIEF DESCRIPTION OF THE DRAWINGS

FIG. 3 is a top perspective view of a of a sub-frame of a spoiler used on the wing of FIG. 2.

FIG. 4 is a bottom perspective view of the sub-frame of the spoiler of FIG. 3

FIG. 7 is a top perspective view of the spoiler showing the top skin plates friction stir welded to the sub-frame.

FIG. 8 is a bottom perspective view of the spoiler showing the bottom skin plate friction stir welded to the sub-frame.

It should be understood that the drawings are not necessarily drawn to scale and that the disclosed examples are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative examples, it will be appreciated that it can be implemented in various other types of examples and in various other systems and environments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Aircraft structures having multiple aerodynamic surfaces, and methods for forming such structures, are disclosed herein having reduced weight and aerodynamic drag. An exemplary aircraft structure includes a sub-frame defining first and second aerodynamic surfaces. Skin plates are joined to the sub-frame by friction stir welded seams to form a monolithic structure. The friction stir welded seams may be continuous or intermittent about a perimeter of the skin plates. Joining the sub-frame and skin plates using friction stir welds avoids the assembly expense, weight, and aerodynamic drag associated with the use of fasteners.

As used in the examples disclosed herein, the terms "aerodynamic surface" and "control surface" are used interchangeably to refer to a component and/or a surface that defines an aerodynamic flow surface used to control flight and/or navigation of an aircraft or other vehicle based on fluid flow (e.g., airflow during movement and/or flight). For example, the term "control surface" encompasses a surface of an aerodynamic structure (e.g., a top surface of a flap) or an actively displaced and/or rotated component such as a flap, spoiler or aileron, for example. As used herein, the term "a chord length" refers to a length along a flow path or airflow direction along a direction of travel of an aircraft, unless described otherwise. As used herein the term "angle from horizontal" of an aircraft refers to an angle and/or relative angles corresponding to a reference plane defined as an angle away from a neutral position of a control surface, whereas the term "horizontal" in this context refers to the neutral position and/or angle of the control surface. As used herein, the term "upper surface" refers to a top surface (e.g., a wing top surface) of an aircraft on opposite side from landing gear of the aircraft while the term "lower surface" refers to a bottom surface side (e.g., a wing bottom surface) that corresponds to the landing gear.

Figure 1:
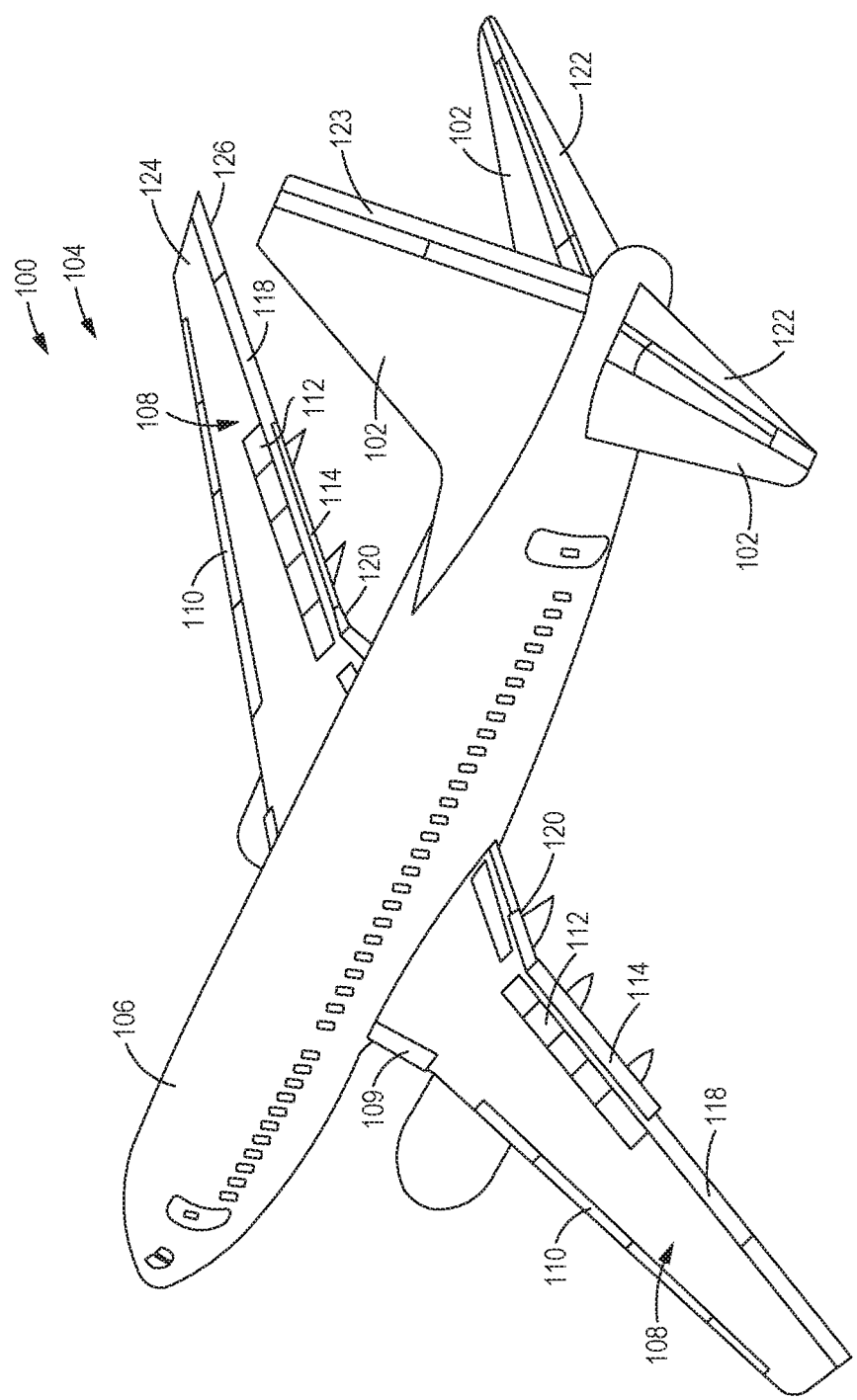
FIG. 1 is a perspective view of an example aircraft that may be used to implement the methods and apparatus disclosed herein.

FIG. 1 illustrates an example aircraft 100 in which the examples disclosed herein may be implemented. In the illustrated example, the aircraft 100 includes stabilizers 102 and wings 104 attached to a fuselage 106. The wings 104 of the illustrated example have control surfaces (e.g., flaps, ailerons, spoilers, tabs, etc.) 108, some of which are located at a trailing edge of the wings 104 and may be displaced or adjusted (e.g., angled, etc.) to provide lift during takeoff, landing and/or flight maneuvers. In some examples, the control surfaces 108 are operated (i.e., displaced) independently of one another. The control surfaces 108 include leading edge flaps 109, leading edge slats 110, upper surface spoilers (e.g., flight spoilers, ground spoilers, upper surface spoilers, etc.) 112, and trailing edge flaps (e.g., rotatable flaps) 114. The control surfaces 108 of the illustrated example also include ailerons 118 and flaperons 120. In this example, the stabilizers 102 include elevators 122 and a rudder 123. The wings 104 also define upper and lower surfaces (e.g., upper and lower sides, upper and lower aerodynamic surfaces, etc.) 124, 126, respectively.

To control flight of the aircraft 100, the upper surface spoilers 112 of the illustrated example alter the lift and drag of the aircraft 100. The trailing edge flaps 114 alter the lift and pitch of the aircraft 100. The flaperons 120 and the ailerons 118 of the illustrated example alter the roll of the aircraft 100. In this example, the edge slats 110 alter the lift of the aircraft 100. The control surfaces 108 of the illustrated example also play a role in controlling the speed of the aircraft 100. For example, the upper surface spoilers 112 may be used for braking of the aircraft 100. Any of the control surfaces 108 of the illustrated example may be independently moved (e.g., deflected) to control the load distribution in different directions over the wing 104, thereby directing movement of the aircraft 100.

The examples described herein may be applied to control surfaces associated with any of the stabilizers 102, the wings 104 and/or any other exterior or outboard structure (e.g., a horizontal stabilizer, a wing strut, an engine strut, a canard stabilizer, etc.) of the aircraft 100. In particular, the wings 104 and/or the stabilizers 102 have control surfaces 108 that can be adjusted to maneuver the aircraft 100 and/or control a speed of the aircraft 100, for example. Additionally or alternatively, in some examples, the fuselage 106 has control surfaces, which may be deflected, to alter the flight maneuvering characteristics during cruise and/or takeoff of the aircraft 100.

Figure 2:
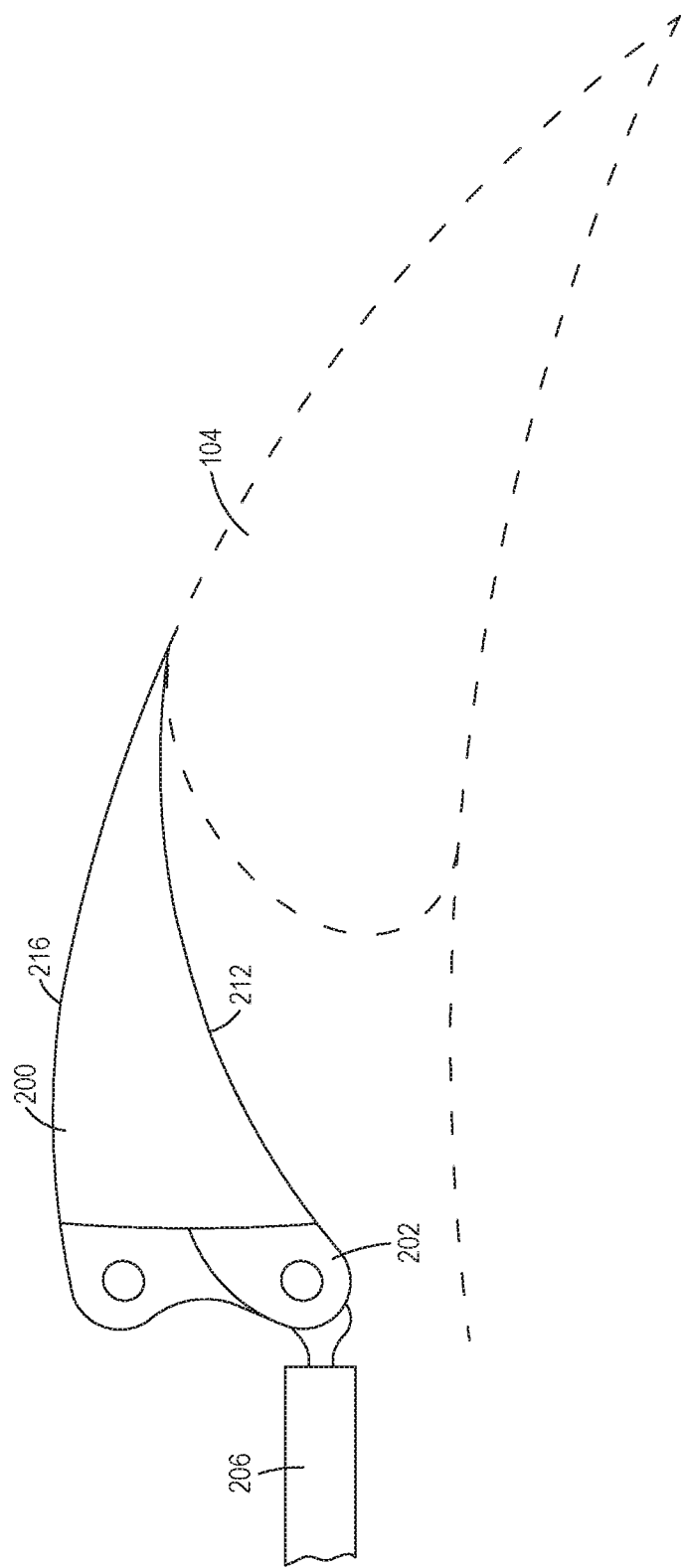
FIG. 2 is a partially schematic side elevation view of a wing of the aircraft of FIG. 1.

FIG. 2 illustrates an aircraft structure in the form of a spoiler 200 provided on the wing 104 of the aircraft 100. The spoiler 200 may have a neutral position, as shown in FIG. 2, in which the spoiler overlies a wing 104 of the aircraft 100. The spoiler 200, however, may be rotated from the neutral position to alter an aerodynamic characteristic of the aircraft, such as lift, in a controlled manner. The spoiler 200 includes fittings, such as actuator lugs 202 configured for attachment to an actuator 206. The actuator 206 may operate to move the spoiler 200 from the neutral position.

FIGS. 3-9 illustrate a first example of a spoiler 200. As best shown in FIGS. 3 and 4, the spoiler 200 generally includes a sub-frame 210 having a side wall 212, with a first outer surface 214 is coupled to the side wall 212. A second outer surface 216 is also coupled to the side wall 212 opposite the first outer surface 214. In the illustrated example, the first and second outer surfaces 214, 216 correspond to upper and lower aerodynamic surfaces of the spoiler 200. That is, the first and second outer surfaces 214, 216 may be directly exposed to ambient air during flight of the aircraft 100, and therefore may be positioned to affect one or more aerodynamic characteristics of the wing 104, such as magnitude of lift. Apertures 218, 220 are formed in the first outer surface 214 while an aperture 222 is shown formed in the second outer surface 216.

Figure 5:
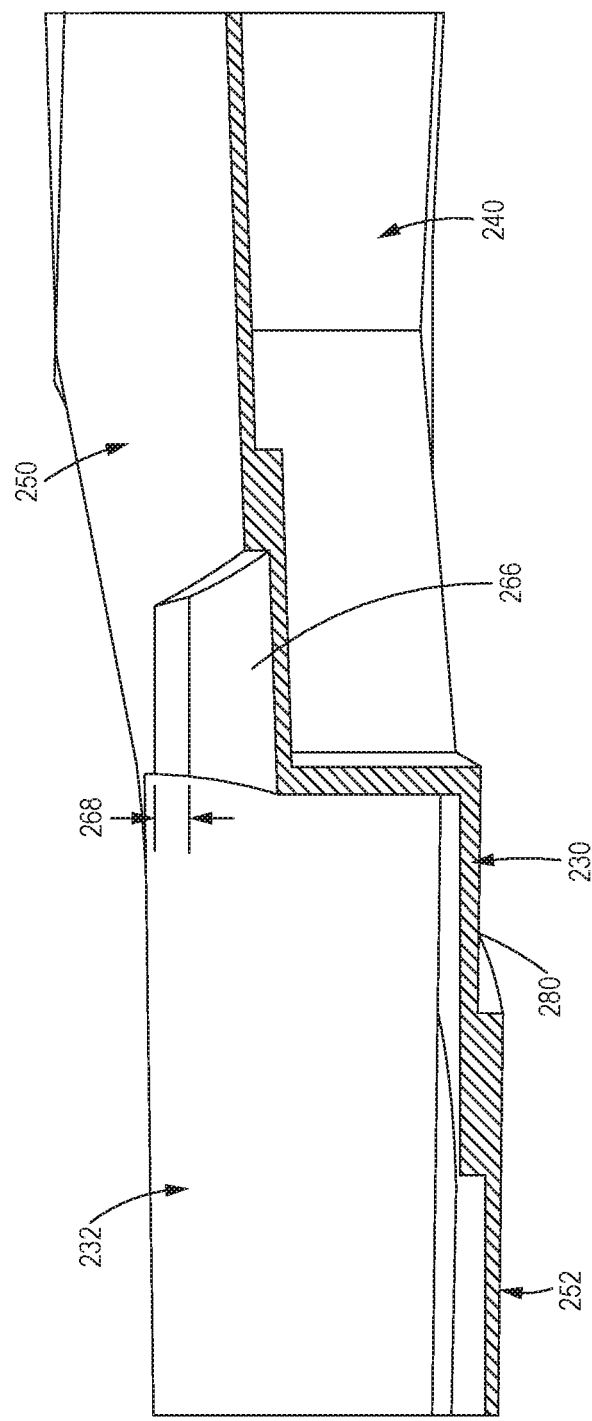
FIG. 5 is a side elevation view, in cross-section, of a portion of the spoiler of FIGS. 3 and 4.

The spoiler 200 includes a plurality of stiffening webs that extend between the first outer surface 214 and the second outer surface 216, thereby to improve the structural strength of the assembled aircraft structure. As best shown in FIGS. 3-5, a first stiffening web 230 extends between the first outer surface 214 and the second outer surface 216, and further extends at least partially around the aperture 218 formed in the first outer surface 214. Accordingly, the aperture 218, first stiffening web 230, and second outer surface 216 define a first stiffening recess 232. A second stiffening web 234 also extends between the first outer surface 214 and the second outer surface 216, and further extends at least partially around the aperture 220 formed in the first outer surface 214. The aperture 220, second stiffening web 234, and second outer surface 216 define a second stiffening recess 236. Still further, a third stiffening web 238 extends between the first outer surface 214 and the second outer surface 216, and further extends at least partially around the aperture 222 formed in the second outer surface 216. The aperture 222, third stiffening web 238, and first outer surface 214 define a third stiffening recess 240.

To minimize weight, portions of the stiffening webs may border more than one stiffening recess. For example, a first common web portion 242 may form parts of both the first stiffening web 230, which borders the first stiffening recess 232, and the third stiffening web 238, which borders the third stiffening recess 240. Similarly, a second common web portion 244 may form parts of both the second stiffening web 234, which borders the second stiffening recess 236, and the third stiffening web 238, which borders the third stiffening recess 240.

The stiffening recesses may span the entire width of the spoiler 200 to improve the structural integrity of the spoiler. For example, as best shown in FIG. 4, the spoiler 200 may further include a fourth stiffening recess 246 defined by the first stiffening web 230, side wall 212, and first outer surface 214, and a fifth stiffening recess 248 defined by the second stiffening web 234, side wall 212, and first outer surface 214. The stiffening recesses may be oriented so that adjacent recesses face opposite outer surfaces of the spoiler 200, so that the stiffener webs and outer surfaces form a corrugated structure that reinforces the spoiler 200. In the illustrated example, the first and second stiffening recesses 232, 236 face toward the first outer surface 214, while the third, fourth, and fifth stiffening recesses 240, 246, 248 face toward the second outer surface 216. Accordingly, the first outer surface 214 defines a first raised stiffening section 250, adjacent to both the first stiffening recess 232 and the second stiffening recess 236, that spans across and forms a portion of the third stiffening recess 240. Similarly, the second outer surface 216 defines a second raised stiffening section 252, adjacent to both the third stiffening recess 240 and the fourth stiffening recess 246, that spans across and defines a portion of the first stiffening recess 232. Still further, the second outer surface 216 defines a third raised stiffening section 254, adjacent to both the third stiffening recess 240 and the fifth stiffening recess 248, that spans across and defines a portion of the second stiffening recess 236.

Figure 6:
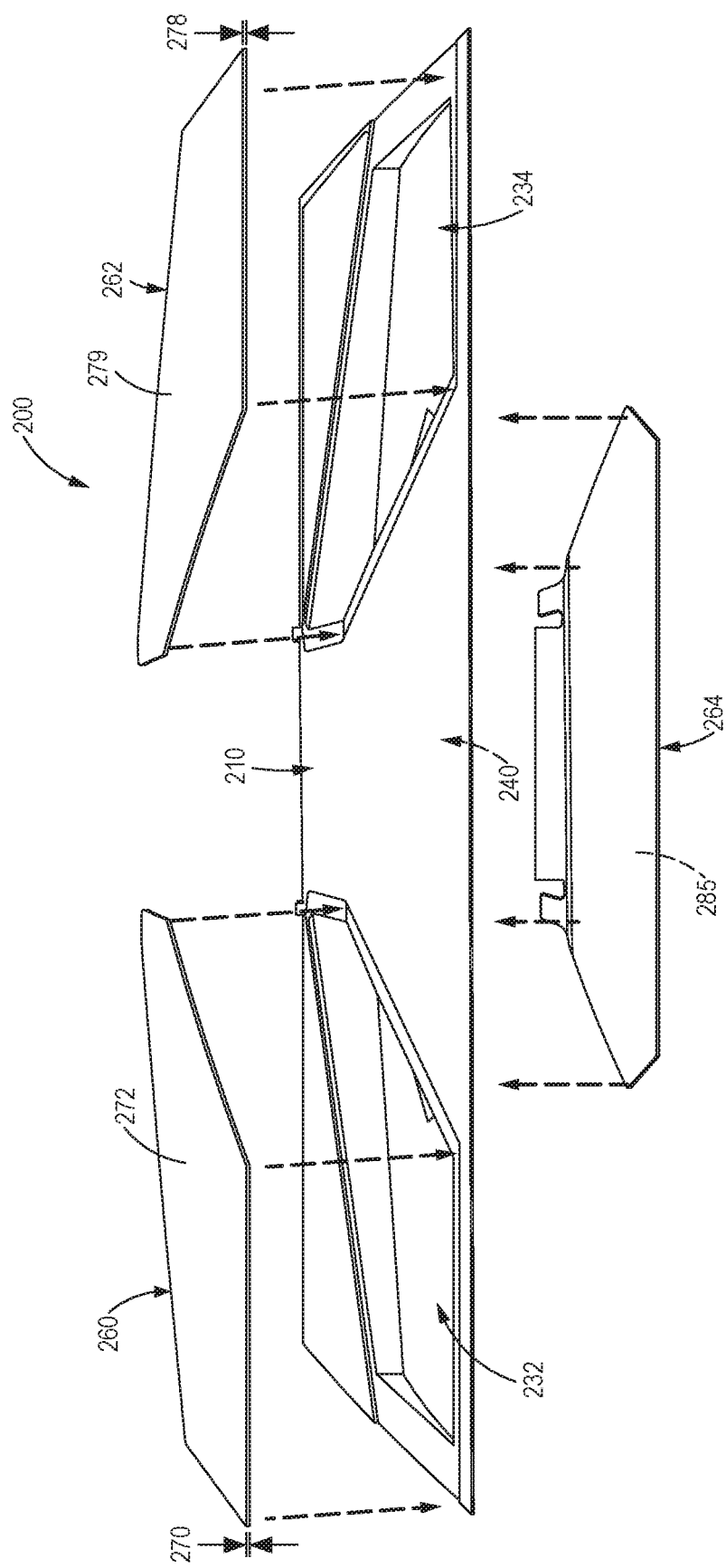
FIG. 6 is an exploded view of the spoiler showing the sub-frame, two top skin plates, and a bottom skin plate.

The spoiler 200 further includes skin plates for closing off the stiffening recesses, thereby to complete the first and second outer surfaces 214, 216 and improve the aerodynamic performance of the spoiler 200. As best shown in FIG. 6, a first skin plate 260 is sized to extend over the first stiffening recess 232 and is shaped conformally with the aperture 218. Similarly, a second skin plate 262 is sized to extend over the second stiffening recess 236 and is shaped conformally with the aperture 220. Still further, a third skin plate 264 is sized to extend over the third stiffening recess 240 and is shaped conformally with the aperture 222. While the fourth and fifth stiffening recesses 246, 248 are shown as being open to the exterior of the spoiler 200, additional skin plates may be provided to close off these recesses.

The stiffening webs may include mating surfaces that securely position the skin plates in place to facilitate joining of the skin plates to the sub-frame 210. For example, as best shown in FIGS. 3-6, the first stiffening web 230 includes a first mating surface 266. The first mating surface 266 may be substantially planar (i.e., is within manufacturing tolerances associated with metal bending, cutting, rolling, and shaping techniques) to conform to a perimeter of the first skin plate 260. Accordingly, in the illustrated example, the first mating surface 266 is a relatively narrow strip extending around a perimeter of the first stiffening recess 232. The first mating surface 266 further may be inwardly offset from the first outer surface 214 by a first offset distance 268. The first offset distance is substantially equal (i.e., is within manufacturing tolerances associated with metal bending, cutting, rolling, and shaping techniques) to a first skin plate thickness 270, so that a first skin plate outer surface 272 is aligned with the first outer surface 214.

Figure 9:
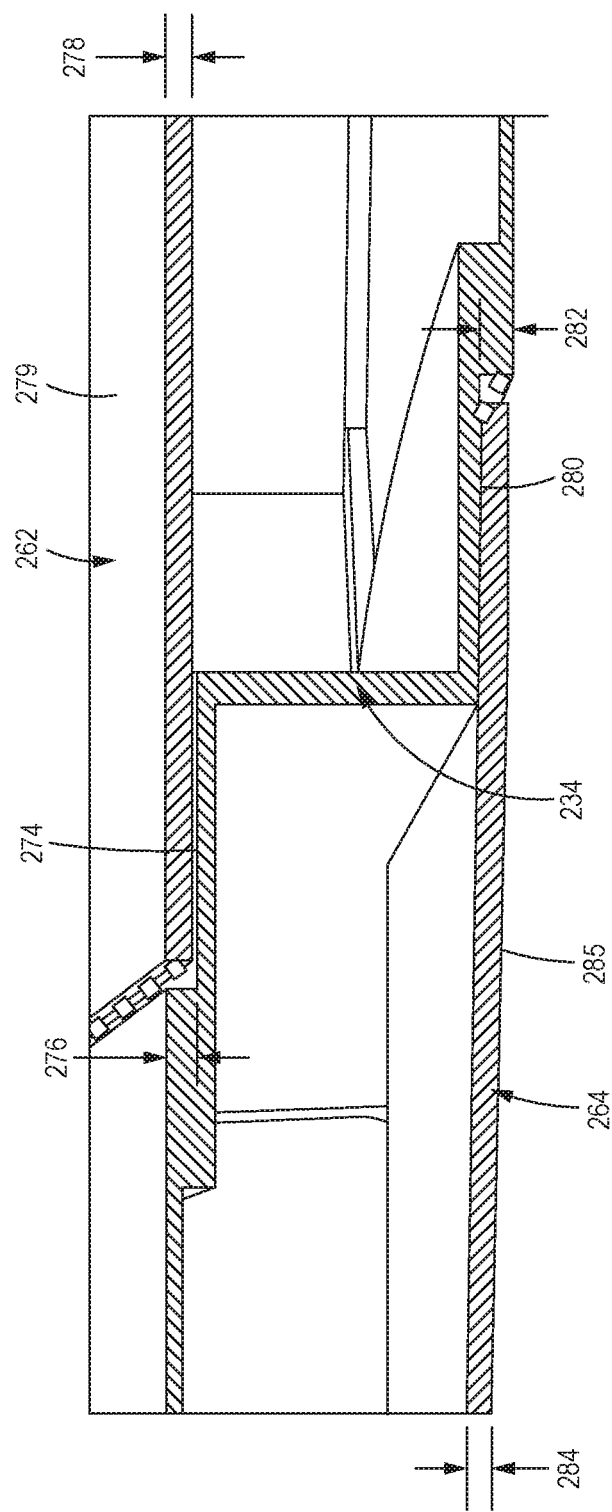
FIG. 9 is a side elevation view, in cross-section, of a portion of the spoiler taken along line 9-9 of FIG. 8.

Similarly, the second stiffening web 234 includes a second mating surface 274 that is substantially planar to conform to a perimeter of the second skin plate 262, thereby to form a relatively narrow strip extending around a perimeter of the second stiffening recess 236. The second mating surface 274 is inwardly offset from the first outer surface 214 by a second offset distance 276 that is substantially equal to a second skin plate thickness 278, so that a second skin plate outer surface 279 is aligned with the first outer surface 214 (FIGS. 6 & 9).

Still further, the third stiffening web 238 includes a third mating surface 280 that is substantially planar to conform to a perimeter of the third skin plate 264, thereby to form a relatively narrow strip extending around a perimeter of the third stiffening recess 240. The third mating surface 280 is inwardly offset from the second outer surface 216 by a third offset distance 282 that is substantially equal to a third skin plate thickness 284, so that a third skin plate outer surface 285 is aligned with the second outer surface 216 (FIG. 9).

The skin plates 260, 262, 264 are joined to the sub-frame 210 using friction stir welded seams, thereby to form a monolithic aircraft structure having reduced weight, improved structural integrity, superior aerodynamic characteristics. Referring to FIGS. 7-9, the first skin plate 260 is joined to the first mating surface 266 of the first stiffening web 230 at a first friction stir welded seam 300. Similarly, the second skin plate 262 is joined to the second mating surface 274 of the second stiffening web 234 at a second friction stir welded seam 302, while the third skin plate 264 is joined to the third mating surface 280 of the third stiffening web 238 at a third friction stir welded seam 304. The friction stir welded seams 300, 302, 304 may be formed using a friction stir welding tool having a pin. During the friction stir welding process, the pin of the friction stir welding tool is rotated and forced through the skin plate and into the associated stiffening web of the sub-frame 210. Heat and pressure generated by the friction stir welding tool mechanically intermixes portions of the stiffening web and the skin plate to form the friction stir welded seam. In the illustrated examples, the friction stir welded seams 300, 302, 304 extend continuously around the perimeters of the skin plates 260, 262, 264, however in alternative examples the friction stir welded seams 300, 302, 304 may be intermittent around the perimeter of the skin plates 260, 262, 264. The recesses and skin plates help to provide a clearly defined path for the friction stir welding tool to follow while forming friction stir welded seams, which helps to facilitate attachment of aerodynamic skin plates. Further, the clearly defined path and the mating surfaces help to contain the weld without backside exposure (e.g., exposure of the weld at the bottom of the recess to which the skin plate is friction stir welded).

Figure 10:
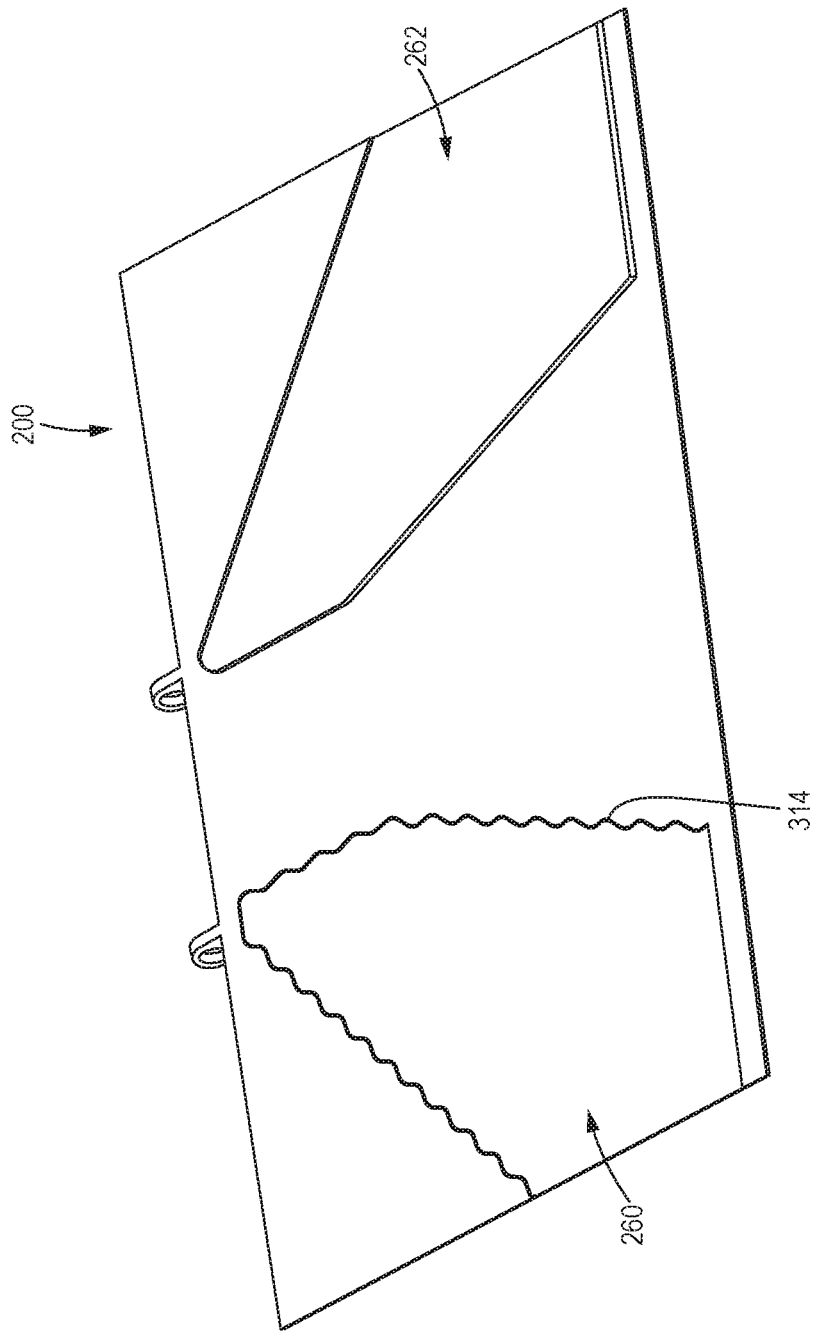
FIG. 10 is a top perspective view of an alternative example of a spoiler having a top skin plate joined to the sub-frame by a friction stir weld having a non-linear weld line.
Figure 11:
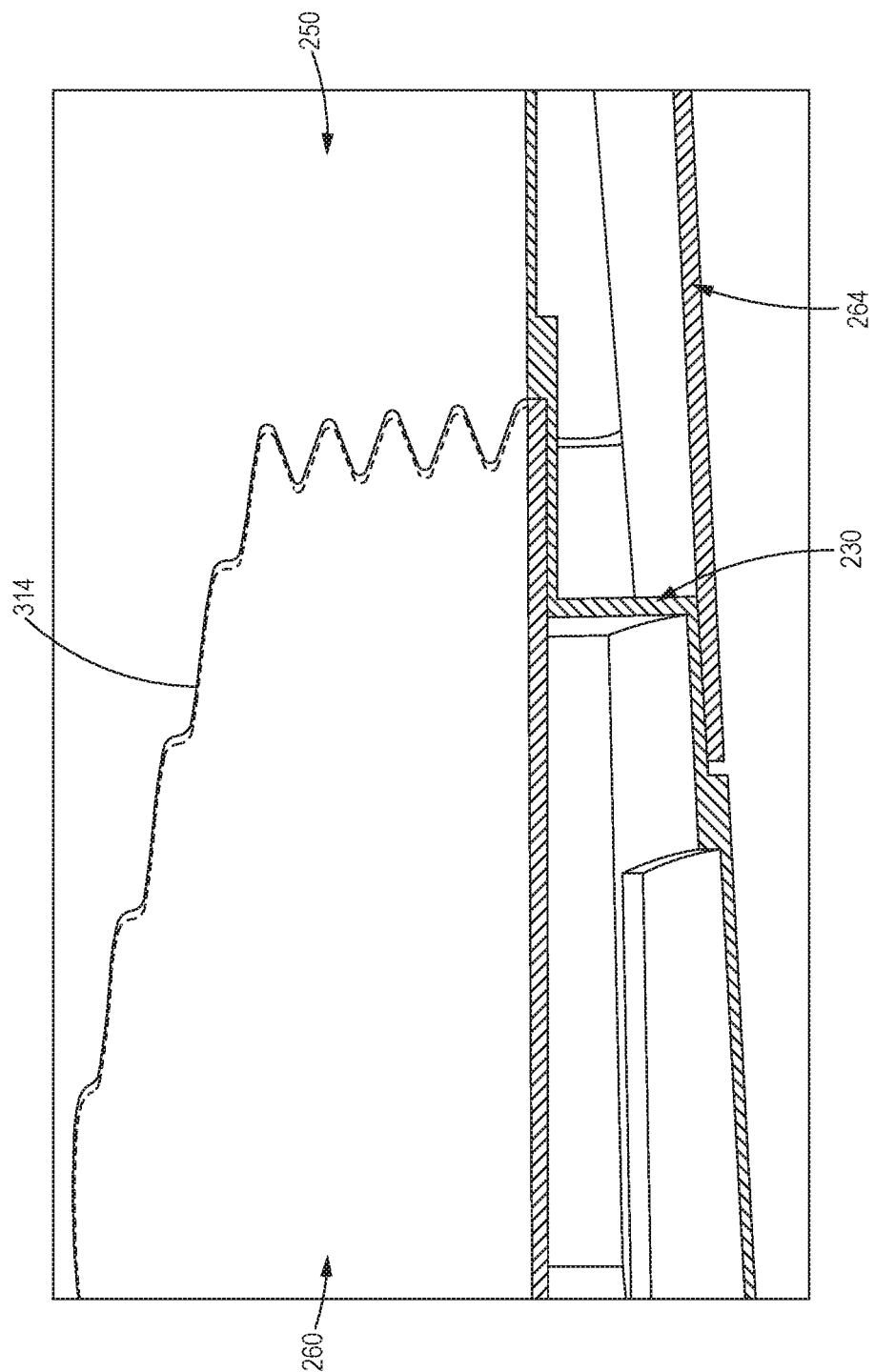
FIG. 11 is a side elevation view, in cross-section, of a portion of the spoiler of FIG. 10.

The friction stir welded seams 300, 302, 304 may be formed in different patterns as they extend around the perimeters of the skin plates 260, 262, 264. In the examples shown in FIGS. 7, 8, and the right-hand side of FIG. 10, each of the first, second, and third friction stir welded seams 300, 302, 304 may be formed by weld lines having linear path segments 310 joined by curved corner segments 312. Alternatively, the weld line used to form the first, second, and third friction stir welded seams 300, 302, 304 may be intermittently or continuously non-linear, which may limit propagation of cracks and improve structural integrity by increasing a length of the weld. The left-hand side of FIG. 10 and FIG. 11, for example, show a non-linear weld line 314 that is at least partially formed in a continuous sinusoidal wave or scalloped pattern. Still other weld line patterns, such as a chevron, may be used.

Within examples, the stiffening webs are configured to direct loads to an area of the spoiler 200 having relatively greater structural strength, thereby to improve the performance and life of the spoiler 200. More specifically, first and second lugs 320, 322 are coupled to the side wall 212 to provide connection points to the wing 104 of the aircraft 100. The first and second lugs 320, 322 are laterally spaced to define an intermediate region 324 of the side wall 212 that extends between the first and second lugs 320, 322. The first and second lugs 320, 322, and the intermediate region 324 form an area of the spoiler 200 having relatively greater structural integrity. The stiffening webs may be configured to direct loads toward this area of the spoiler 200.

Specifically, the stiffening webs may include web segments traversing paths that are aligned with the intermediate region 324 of the side wall 212. Referring to FIG. 3, the first stiffening web 230 includes web segments 330, 332 and the second stiffening web 234 includes web segments 334, 336, wherein each of the web segments 330, 332, 334, 336 is aligned with the intermediate region 324. Referring to FIG. 4, the third stiffening web 238 includes web segments 338, 340 that are aligned with the intermediate region 324. By providing multiple web segments that are aligned with the intermediate region 324, loads applied to the spoiler 200 are directed to the lugs 320, 322, thereby improving the structural integrity of the spoiler 200.

Figure 12:
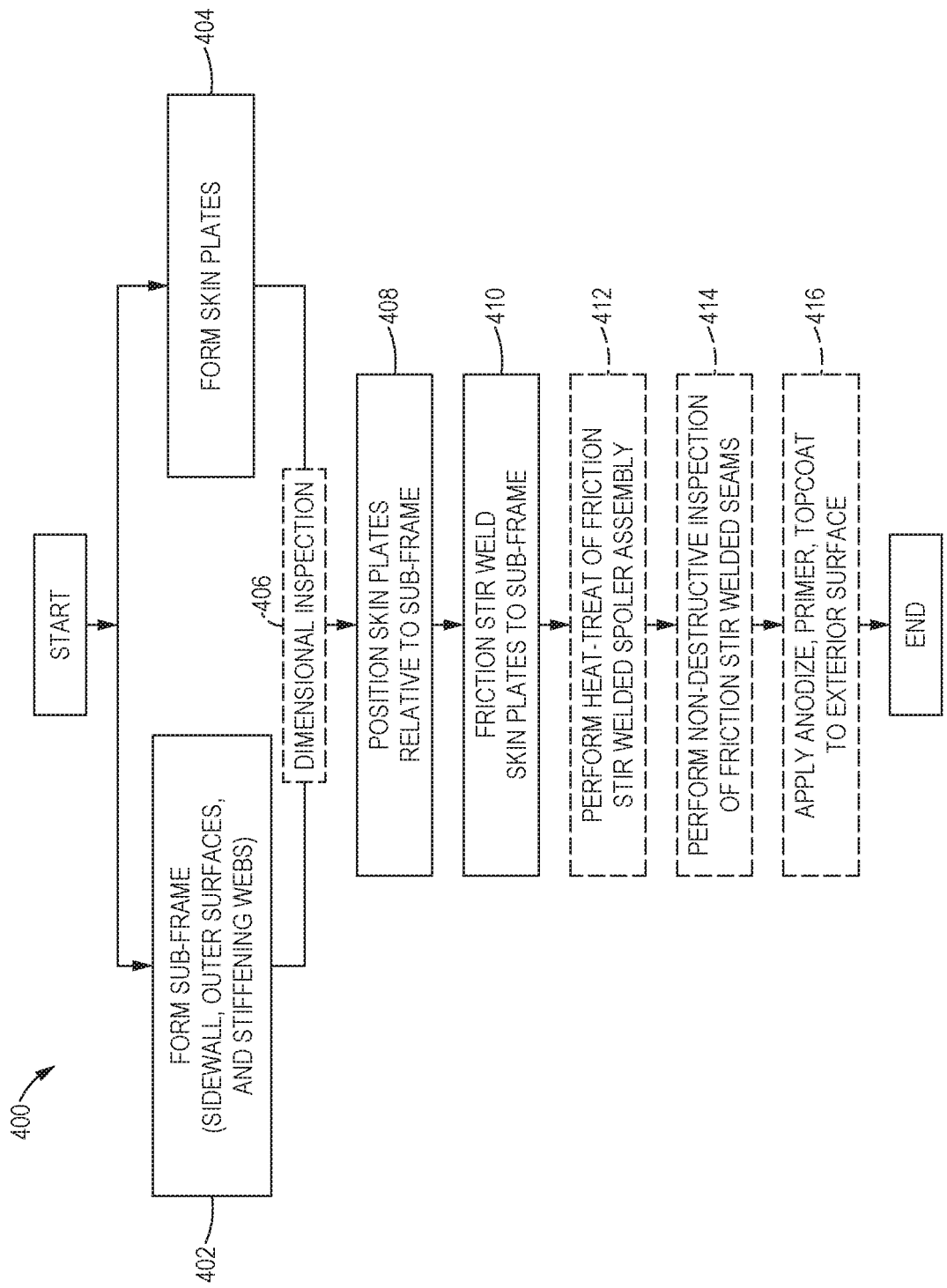
FIG. 12 is a schematic flowchart illustrating a method of forming a monolithic aircraft structure having multiple aerodynamic surfaces, according to the present disclosure.

FIG. 12 schematically illustrates a method 400 of forming a monolithic aircraft structure having multiple aerodynamic surfaces. The method begins at block 402 by forming the sub-frame 210. Within examples, the sub-frame 210 includes the side wall 212, the first and second outer surfaces 214, 216 coupled to the side wall 212, and the first and second stiffening webs 230, 234 extending between the first and second outer surfaces 214, 216 and at least partially around the first and second apertures 218, 220. The method 400 may include, at block 404, forming skin plates. The skin plates may include the first skin plate 260 sized to extend over the first stiffening recess 232, the second skin plate 262 sized to extend over the second stiffening recess 236, and the third skin plate 264 sized to extend over the third stiffening recess 240. The method 400 may optionally include a dimensional inspection of the sub-frame and the skin plates at block 406, to ensure that the components meet the desired size specifications.

At block 408, the method 400 may continue by positioning the skin plates relative to the sub-frame, so that the sub-frame mating surfaces engage perimeters of the skin plates. Continuing at block 410, the method 400 includes friction stir welding the skin plates to the sub-frame to form friction stir welded seams between the sub-frame and the skin plates, thereby to form a monolithic aircraft structure.

In an example, friction stir welding the first skin plate 260 to the first stiffening web 230 includes forming at least a portion of the first friction stir welded seam 300 with a continuous sinusoidal wave pattern, and friction stir welding the second skin plate 262 to the second stiffening web 234 includes forming at least a portion of the second friction stir welded seam 302 with a continuous sinusoidal wave pattern.

In an example, the second aperture 220 is formed in the first outer surface 214, and forming the sub-frame 210 further includes a third stiffening web 238 extending between the first outer surface 214 and the second outer surface 216, the third stiffening web 238 extending at least partially around a third aperture 222 formed in the second outer surface 216 to define a third stiffening recess 240. In this example, the method 400 further includes joining a third skin plate 264 to the third stiffening web 238 with a third friction welded seam 304, wherein the third skin plate 264 is sized to extend over the third stiffening recess 240 and shaped conformally with the third aperture 222.

In an example, forming the sub-frame 210 at block 402 further includes forming a first lug 320 and a second lug 322 on the side wall 212 to define an intermediate region 324 of the side wall 212 extending between the first lug 320 and the second lug 322, and wherein each of the first stiffening web 230 and the second stiffening web 234 includes at least two web segments traversing paths aligned with the intermediate region 324 of the side wall 212.

The method 400 may include several optional steps after the friction stir welded seams are formed. For example, at block 412, the assembled sub-frame and skin components are heat treated to improve structural integrity of the spoiler 200. At block 414, non-destructive inspection of the friction stir welded seams is performed to ensure that the spoiler 200 is structurally sound. Finally, at block 416, at least one surface treatment selected from a group of surface treatments consisting of anodizing, primer coating, and topcoating is applied to the spoiler 200, thereby to improve aerodynamic qualities (e.g., reducing drag) over the aerodynamic surfaces.

Beneficially, the disclosed aircraft control structure and method help to provide clearly defined paths for a friction stir welding tool to follow while forming friction stir welded seams, which helps to facilitate attachment of aerodynamic skin plates. The disclosed aircraft control structure and method also help to improve the structural strength of the assembled aircraft control structure All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary examples is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. Additionally, aspects of the different examples can be combined with or substituted for one another. Finally, the description herein of any reference or patent, even if identified as "prior," is not intended to constitute a concession that such reference or patent is available as prior art against the present disclosure.

What is claimed is:

1. An aircraft control structure, comprising:
   a side wall;
   a first outer surface coupled to the side wall;
   a second outer surface coupled to the side wall and opposite the first outer surface:
   a first stiffening web extending between the first outer surface and the second outer surface, the first stiffening web extending at least partially around a first aperture formed in the first outer surface to define a first stiffening recess;
   a second stiffening web extending between the first outer surface and the second outer surface, the second stiffening web extending at least partially around a second aperture formed in the first outer surface or the second outer surface to define a second stiffening recess;
   a first skin plate sized to extend over the first stiffening recess and shaped conformally with the first aperture, wherein the first skin plate is joined to the first stiffening web at a first friction stir welded seam; and
   a second skin plate sized to extend over the second stiffening recess and shaped conformally with the second aperture, wherein the second skin plate is joined to the second stiffening web at a second friction stir welded seam.

2. The aircraft control structure of claim 1, in which the first stiffening web includes a first mating surface inwardly offset from the first outer surface, and in which the first friction stir welded seam joins the first skin plate to the first mating surface of the first stiffening web.

3. The aircraft control structure of claim 2, in which the first skin plate has a first skin plate thickness, and in which the first mating surface of the first stiffening web is spaced from the first outer surface by an offset distance substantially equal to the first skin plate thickness.

4. The aircraft control structure of claim 1, in which each of the first friction stir welded seam and the second friction stir welded seam comprises a plurality of linear weld line segments.

5. The aircraft control structure of claim 1, in which portions of each of the first friction stir welded seam and the second friction stir welded seam comprises a continuously non-linear weld line.

6. The aircraft control structure of claim 5, in which each continuously non-linear weld line comprises a continuous sinusoidal wave pattern.

7. The aircraft control structure of claim 1, further comprising first and second lugs coupled to the side wall to define an intermediate region of the side wall extending between the first and second lugs, wherein each of the first stiffening web and the second stiffening web includes at least two web segments traversing paths aligned with the intermediate region of the side wall.

8. The aircraft control structure of claim 1, in which the second aperture is formed in the first outer surface, the aircraft control structure further comprising:
   a third stiffening web extending between the first outer surface and the second outer surface, the third stiffening web extending at least partially around a third aperture formed in the second outer surface to define a third stiffening recess; and
   a third skin plate sized to extend over the third stiffening recess and shaped conformally with the third aperture, wherein the third skin plate is joined to the third stiffening web at a third friction stir welded seam.

9. The aircraft control structure of claim 1, in which:
the second aperture is formed in the second outer surface;
the first outer surface defines a first raised stiffening section adjacent the first stiffening recess;
the second outer surface defines a second raised stiffening section adjacent the second stiffening recess;
the first raised stiffening section spans across and defines a portion of the second stiffening recess; and
the second raised stiffening section spans across and defines a portion of the first stiffening recess.

10. The aircraft control structure of claim 9, in which the first outer surface comprises an upper aerodynamic surface of a spoiler and the second outer surface comprises a lower aerodynamic surface of the spoiler.

11. An aircraft spoiler, comprising:
a side wall;
an upper aerodynamic surface coupled to the side wall;
a lower aerodynamic surface coupled to the side wall and opposite the upper aerodynamic surface;
a first stiffening web extending between the upper aerodynamic surface and the lower aerodynamic surface, the first stiffening web extending at least partially around a first aperture formed in the upper aerodynamic surface to define a first stiffening recess, the first stiffening web including a first mating surface inwardly offset from the upper aerodynamic surface;
a second stiffening web extending between the upper aerodynamic surface and the lower aerodynamic surface, the second stiffening web extending at least partially around a second aperture formed in the upper aerodynamic surface to define a second stiffening recess, the second stiffening web including a second mating surface inwardly offset from the upper aerodynamic surface;
a first skin plate sized to extend over the first stiffening recess and shaped conformally with the first aperture, wherein the first skin plate is joined to the first mating surface of the first stiffening web at a first friction stir welded seam; and
a second skin plate sized to extend over the second stiffening recess and shaped conformally with the second aperture, wherein the second skin plate is joined to the second mating surface of the second stiffening web at a second friction stir welded seam.

12. The aircraft spoiler of claim 11, in which:
the first skin plate has a first skin plate thickness;
the second skin plate has a second skin plate thickness;
the first mating surface of the first stiffening web is spaced from the upper aerodynamic surface by a first offset distance substantially equal to the first skin plate thickness; and
the second mating surface of the second stiffening web is spaced from the upper aerodynamic surface by a second offset distance substantially equal to the second skin plate thickness.

13. The aircraft spoiler of claim 11, further comprising:
a third stiffening web extending between the upper aerodynamic surface and the lower aerodynamic surface, the third stiffening web extending at least partially around a third aperture formed in the lower aerodynamic surface to define a third stiffening recess, the third stiffening web including a third mating surface inwardly offset from the lower aerodynamic surface; and a third skin plate sized to extend over the third stiffening recess and shaped conformally with the third aperture, wherein the third skin plate is joined to the third mating surface of the third stiffening web at a third friction stir welded seam.

14. The aircraft spoiler of claim 11, in which portions of each of the first friction stir welded seam and the second friction stir welded seam comprises a continuously non-linear weld line.

15. The aircraft spoiler of claim 14, in which each continuously non-linear weld line comprises a continuous sinusoidal wave pattern.

16. The aircraft spoiler of claim 11, further comprising first and second lugs coupled to the side wall to define an intermediate region of the side wall extending between the first and second lugs, wherein each of the first stiffening web and the second stiffening web includes at least two web segments traversing paths aligned with the intermediate region of the side wall.

17. A method of forming a monolithic aircraft structure having multiple aerodynamic surfaces, the method comprising:
forming a sub-frame including:
a side wall;
a first outer surface coupled to the side wall;
a second outer surface coupled to the side wall and opposite the first outer surface;
a first stiffening web extending between the first outer surface and the second outer surface, the first stiffening web extending at least partially around a first aperture formed in the first outer surface to define a first stiffening recess; and
a second stiffening web extending between the first outer surface and the second outer surface, the second stiffening web extending at least partially around a second aperture formed in the first outer surface or the second outer surface to define a second stiffening recess;
friction stir welding a first skin plate to the first stiffening web to form a first friction stir welded seam, wherein the first skin plate is sized to extend over the first stiffening recess and shaped conformally with the first aperture; and
friction stir welding a second skin plate to the second stiffening web to form a second friction stir welded seam, wherein the second skin plate is sized to extend over the second stiffening recess and shaped conformally with the second aperture.

18. The method of claim 17, in which friction stir welding the first skin plate to the first stiffening web comprises forming at least a portion of the first friction stir welded seam with a continuous sinusoidal wave pattern, and in which friction stir welding the second skin plate to the second stiffening web comprises forming at least a portion of the second friction stir welded seam with a continuous sinusoidal wave pattern.

19. The method of claim 17, in which the second aperture is formed in the first outer surface, and forming the sub-frame further comprises a third stiffening web extending between the first outer surface and the second outer surface, the third stiffening web extending at least partially around a third aperture formed in the second outer surface to define a third stiffening recess, the method further including joining a third skin plate to the third stiffening web with a third friction weld, wherein the third skin plate is sized to extend over the third stiffening recess and shaped conformally with the third aperture.

20. The method of claim 17, in which forming the sub-frame further includes forming a first lug and a second lug on the side wall to define an intermediate region of the side wall extending between the first lug and the second lug, and wherein each of the first stiffening web and the second stiffening web includes at least two web segments traversing paths aligned with the intermediate region of the side wall.

\* \* \* \* \*